United States Patent
Mun et al.

(10) Patent No.: US 10,623,717 B2
(45) Date of Patent: Apr. 14, 2020

(54) TURN TABLE FOR PHOTOGRAPHING AND IMAGE PHOTOGRAPHING SYSTEM USING SAME

(71) Applicant: ORANGEMONKIE KOREA, INC., Seoul (KR)

(72) Inventors: Sang Kon Mun, Gyeonggi-do (KR); Jun Myeong Park, Seoul (KR); Yong Su Cho, Seoul (KR)

(73) Assignee: ORANGEMONKIE KOREA, INC., Seoul (KR)

( * ) Notice: Subject to any disclaimer, the term of this patent is extended or adjusted under 35 U.S.C. 154(b) by 0 days.

(21) Appl. No.: 15/309,677

(22) PCT Filed: Apr. 28, 2016

(86) PCT No.: PCT/KR2016/004456
§ 371 (c)(1),
(2) Date: Nov. 8, 2016

(87) PCT Pub. No.: WO2017/122876
PCT Pub. Date: Jul. 20, 2017

(65) Prior Publication Data
US 2018/0309976 A1    Oct. 25, 2018

(30) Foreign Application Priority Data
Jan. 14, 2016 (KR) .................... 10-2016-0004607

(51) Int. Cl.
*H04N 13/221* (2018.01)
*H04N 13/254* (2018.01)
(Continued)

(52) U.S. Cl.
CPC ........... *H04N 13/221* (2018.05); *G03B 15/03* (2013.01); *G03B 17/56* (2013.01); *H04N 5/262* (2013.01);
(Continued)

(58) Field of Classification Search
CPC .... H04N 13/221; H04N 13/20; H04N 13/254; H04N 13/296; H04N 5/262
(Continued)

(56) References Cited

U.S. PATENT DOCUMENTS 9,618,830 B1 * 4/2017 Nicholas .............. G03B 17/561
2004/0192400 A1 * 9/2004 Chwa .................. H04M 1/0218
455/566

OTHER PUBLICATIONS

Translation of Sung, Three-dimension photography apparatus, KR20030016452A. (Year: 2003).*
(Continued)

*Primary Examiner* — Matthew K Kwan
(74) *Attorney, Agent, or Firm* — Hoffmann & Baron, LLP

(57) ABSTRACT

A technology is provided in which a user generates a 3-D image for a photographing target only by a simple device without the rent of a studio or the use of a professional product and easily controls the generation of the 3-D image. The photographing turn table is installed in one area of a studio device having one area in which a photographing target is located and having an open one surface to allow image photographing through the open one surface. The photographing turn table includes a lower body, which is fixedly located in the one area and provided at a part of one surface thereof located in an opposite direction to a direction of a photographing device to emit light from the outer surface toward an inner wall which is included in the one area to form a background of the studio device, an upper body coupled to a top surface of the lower body rotatably relatively to the lower body, and a rotation module which include a rotation unit to rotate the upper body relatively to the lower body, and a rotation control device including a communication function to receive a control command from an external device and to control driving of the rotation unit according to the control command.

14 Claims, 6 Drawing Sheets

(51) Int. Cl.
  *H04N 13/296* (2018.01)
  *G03B 15/03* (2006.01)
  *G03B 17/56* (2006.01)
  *H04N 5/262* (2006.01)
  *H04N 13/20* (2018.01)
  *H05B 47/10* (2020.01)

(52) U.S. Cl.
  CPC ........... *H04N 13/20* (2018.05); *H04N 13/254* (2018.05); *H04N 13/296* (2018.05); *H05B 47/10* (2020.01); *H04N 2213/001* (2013.01)

(58) Field of Classification Search
  CPC .. H04N 2213/001; G03B 15/03; G03B 17/56; H05B 37/02
  USPC .......................................................... 348/46
  See application file for complete search history.

(56) References Cited

OTHER PUBLICATIONS

Translation of Sung, Apparatus for controlling three-dimension photography mechanism, KR20030016453A. (Year: 2003).*
Translation of Takigawa, Remotely photographed picture service system, JP2005012722A. (Year: 2005).*

* cited by examiner

TURN TABLE FOR PHOTOGRAPHING AND IMAGE PHOTOGRAPHING SYSTEM USING SAME

This application claims priority from International patent application No. PCT/KR2016/004456, filed Apr. 28, 2016, which claims priority from Korean patent application No. 10-2016-0004607, filed on Jan. 14, 2016, both of which are incorporated herein in their entirety.

FIELD OF THE INVENTION

The present invention relates to a turnable table capable of photographing a photographing target as the photographing target is located on the table, and more particularly to a turnable table for automatically generating a 3-D image by photographing a photographing target at multiple angles using a studio device, and a system for automatically generating and providing a 3-D image of the photographing target by controlling the table and setting a photographing condition to photograph the photographing target while controlling the table.

BACKGROUND OF THE INVENTION

Recently, as blogs, shopping malls, and websites are actively operated, individuals or small businesses have photographed articles and registered images of the photographed articles in the blogs, shopping malls, and websites.

In particular, as hardware, image processing technologies and network technologies have been developed, various technologies have been developed to photograph a photographing target at multiple angles, and then combine the images of the photographing target with each other to generate a three dimensional (3-D) image of the photographing target so that the 3-D image is shared between other users through a network, or registered as an image of an article, thereby allowing users to recognize the article with reality.

However, in general, when a user personally photographs the photographing target using a camera, the photographing is performed in the state that a background color and light for an article are not adjusted, so that the background may be shaded or photographing quality may be degraded. In particular, in the case of a 3-D image, since a user must photograph the article at each of multiple angles to take the image, the 3-D image is hardly used.

Accordingly, in order to take an image of an article, especially to generate a 3-D image of a photographing target, users must photograph the article in a professional studio or must use a dedicated product for taking a 3-D image. Accordingly, when the article is photographed, time and cost are significantly required, and the users cannot personally photograph the article.

SUMMARY OF THE INVENTION

An object of the present invention is to provide a technology in which a user can generate a 3-D image for a photographing target only by a simple device without the rent of a studio or the use of a professional product and can easily control the generation of the 3-D image, so that the user can generate a 3-D image for an article using existing equipment without visiting the studio and share the 3-D image with another user for the use of the 3-D image.

In order to accomplish the object, according to one embodiment of the present invention, there is provided a photographing turn table installed in one area of a studio device having one area in which a photographing target is located and having an open one surface to allow image photographing through the open one surface. The photographing turn table includes a lower body, which is fixedly located in the one area and provided at a part of one surface thereof located in an opposite direction to a direction of a photographing device to emit light from the outer surface toward an inner wall which is included in the one area to form a background of the studio device, an upper body coupled to a top surface of the lower body rotatably relatively to the lower body, and a rotation module which include a rotation unit to rotate the upper body relatively to the lower body, and a rotation control device including a communication function to receive a control command from an external device and to control driving of the rotation unit according to the control command.

Meanwhile, according to one embodiment of the present invention, there is provided an image photographing system for photographing an image using the photographing turn table according to one embodiment of the present invention. The image photographing system includes a photographing device to photograph a photographing target placed on the photographing turn table, a photographing control module connected with the photographing device and the rotation control device of the photographing turn table to transmit/receive data and to control the photographing device to photograph the photographing target rotated together with rotation of the photographing turn table according to the control command, and an image generating device which combines two dimensional photographed images of the photographing target, which is photographed by the photographing device, with each other to generate a three dimensional photographed image of the photographing target.

As described above, according to the present invention, the photographing target is placed on the turn table for the photographing, which is simply provided, and the portable terminal simply controls the operation of the turn table, so that the turn table for photographing is automatically rotated while the photographing device photographs the photographing target.

Accordingly, the studio device and the turn table for photographing are provided to simply photograph and recognize the 3-D image of the photographing target without the rent of a studio or the use of the professional photographing equipment.

Therefore, the professional 3-D image can be generated at significantly low cost, so that the user can generate a 3-D image for an article using existing equipment without visiting the studio and can share the 3-D image with another user for the use of the 3-D image. Accordingly, the online share of the information on the article and the online check of the article can be used for the general purpose.

DESCRIPTION OF PREFERRED EMBODIMENTS

Hereinafter, a turn table for photographing and an image photographing system using the same according to one embodiment of the present invention will be described with reference to accompanying drawings.

The following embodiment is provided for the illustrative purpose, and the present invention is not limited thereto. Accordingly, equivalents of the present invention can belong to the scope of the present invention.

It should be noticed that, although the same components are expressed on different drawings, the same components will be assigned with the same reference numbers when the reference numbers are assigned to components of accompanying drawings. In the following description, if detailed description about well-known functions or configurations may make the subject matter of the disclosure unclear, the detailed description will be omitted.

Further, in the following description of components of the present invention, the terms "First", "Second", "A", "B", (a), and (b) can be used. The terms are used to distinguish a predetermined component from other components, and do not limit the original characteristics, the sequence, or the order of relevant components. When a certain component is "linked", "coupled", or "connected" to another component, the certain component may be directly linked or connected to the another component, but still another component may be "linked", "coupled", or "connected" between the components.

In the embodiment of the present invention, "communication", "telecommunication network", and "network" may have the same meaning. The three terms refer to wired/wireless short range communication network and a broadband data communication network to transmit/receive a file among a user terminal, a terminal of another user, and a download server.

Figure 1:
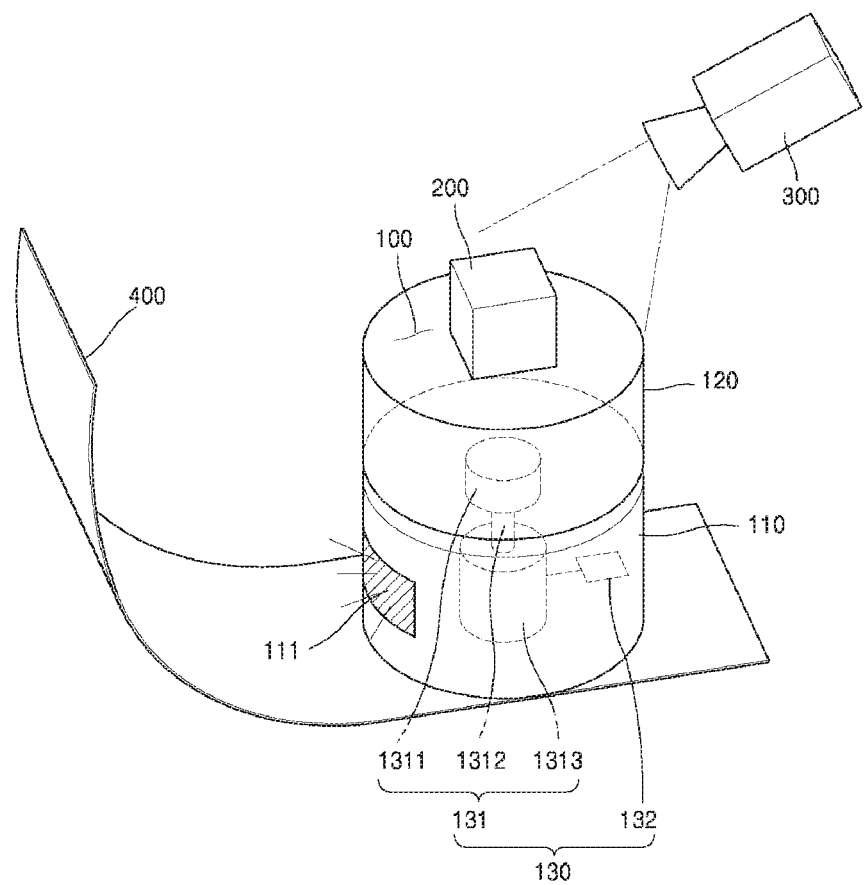
FIG. 1 is a view to explain the structure of a turn table for photographing according to one embodiment of the present invention.

FIG. 1 is a view to explain the structure of a turn table for photographing according to one embodiment of the present invention.

Referring to FIG. 1, a turn table 100 for photographing according to one embodiment of the present invention is a device which has one area (without a reference number) for a photographing target 200 to photograph the photographing target 200 by a photographing device 300, and can be installed in the one area of a studio device (not shown). In detail, the turn table 100 includes a lower body 110, an upper body 120, and a rotation module 130.

The lower body 110 is configured to be fixedly located in the one area, in detail, on an inner wall 400 included in the one area to form the background of the studio device. As shown in FIG. 1, the lower body 110 has the configuration in which a light emitting device 111 is installed at a part of one surface located in an opposite direction to that of the photographing device 300 to emit light toward the inner wall 400 of the studio device forming one area of the outer surface.

According to the present invention, when photographing the photographing target 200, the photographing device 300 photographs an inner part of the one area through an open one surface as described above, thereby photographing the photographing target 200.

In this case, to exactly extract the photographing target 200 from the image through various schemes, such as Chroma keyer scheme, the inner wall 400, the lower body 110, and the upper body 120 may be configured in the same color (for example white). However, even if the inner wall 400, the lower body 110, and the upper body 120 are configured in the same color, if light reflected from the inner wall 400, the lower body 110, the upper body 120, and the gap between the lower and upper bodies 110 and 120 is incident into the photographing device 300, the reflected light is incident into the boundaries among the inner wall 400, the lower body 110, the upper body 120, and the gap, so that the boundaries may be expressed on the image. In this case, when extracting the photographing target 200 or editing other images, the background may not be extracted due to pixels corresponding to the boundaries and a pixel corresponding to a shadow.

In order to solve the problem, according to the present invention, as shown in FIG. 1, the light emitting unit 111 is provided on an outer surface of the lower body 110 in the opposite direction to that of the photographing device 300, which is configured as the technical feature of the present invention, thereby emitting light in predetermined amount or more toward the inner wall 400.

In this case, the light emitted from the light emitting unit 111 is reflected from the inner wall 400 and incident into the photographing device 300. In this case, the boundaries or the shadow is removed by light emitted from the light emitting unit 111 and the reflected light, and only the light reflected from the inner wall 400, the lower body 110, and the upper body 120 is incident into the photographing device 300. Accordingly, the image has no boundary or shadow.

According to the present invention, since the image has no boundary or shadow by the light emitting unit 111, the background other than the photographing target 200 is effectively photographed in one uniform color when the photographing target 200 is located in one area of the studio device and photographed by the photographing device 300, so that the photographing effect in a professional studio can be produced at low cost regardless of space and time, which is an object of the present invention.

Meanwhile, in order to maximize the above effect, as shown in FIG. 1, the inner wall 400 of the studio device, which reflects the light emitted from the light emitting unit 111, is preferably in the shape of a curved surface. When the inner wall 400 has the bending surface different from that of FIG. 1, a boundary corresponding to a bending line of the bending surface may be expressed on the image.

Meanwhile, when excessively bright light is emitted from the light emitting unit 111, the image quality of the photographing target 200 may be degraded. In addition, the function of the light emitting unit 111 may be effectively made according to colors of the inner wall 400 forming the background.

Therefore, according to one embodiment of the present invention, although not shown in FIG. 1, a light emission control device may be additionally provided to be connected with the light emitting unit 111 to control at least one of a light quantity and a color temperature of the light emitting unit 111 under a control command for the light quantity and the color temperature of the light emitting unit 111, which is transmitted from an external device.

Meanwhile, an area irradiated with light emitted from the light emitting unit 111 may be an important factor to remove the boundaries according to the heights of the photographing target 200, the lower body 110, and the upper body 120, and the photographing location of the photographing device 300. Accordingly, the light emission control device may control the light irradiation area irradiated with the light emitted from the light emitting unit 111 according to the control command from the external device.

The external device, which transmits the control command to the light emission control device, may include hardware components, such as control buttons offline installed on the light emission control device, or all of other control units. In other words, the external device may include all components sufficient to perform the above function.

Meanwhile, the upper body 120 is coupled to a top surface of the lower body 110 to perform relative rotation to the lower body 110. In detail, as shown in FIG. 1, the upper body 120 has the structure that the photographing target 200 is located therein, and has the structure allowing a function of generating the 3-D image by photographing the photographing target 200 while photographing the photographing target 200. In other words, the lower body 110 is fixedly installed on one area as described above, so that only the upper body 120 is rotated.

According to the present invention, in order to minimize the boundaries, at least one or all of the upper and lower bodies 120 and 110 are configured in a cylindrical shape, and have preferably an equal diameter, but the present invention is not limited thereto. For example, the lower body 110 may have various shapes, such as a conical shape, and may include components to minimize the boundaries.

According to the present invention, in order to rotate the upper body 120, the rotation module 130 may be configured to couple the lower body 110 to the upper body 120. The rotation module 130 may include a rotation unit 131 to rotate the upper body 120 relatively to the lower body 110, and a rotation control device 132 having a communication function to receive the control command from the external device and to control the operation of the rotation unit according to the control command.

In detail, the rotation unit 131 preferably includes a power transmission unit 1311 coupled to the body 120, a rotation shaft 1212 coupled to the power transmission unit 1311 to provide rotational force, and a motor 1313 to receive energy from a power source to generate the rotational force and to provide the rotational force to the rotation shaft 1212. However, the upper body 120 may include components sufficient to rotate the upper body 120.

The rotation control device 132 controls the motor 1313 to control the rotational force of the rotation unit 131, and has the function of transceiving data, which includes a short range communication function as described above, to receive the control command from the external device, so that the rotational force of the rotation unit 131 is controlled.

In detail, the object of the present invention is to generate two dimensional (2-D) images by the preset number of frequencies during the rotation of the photographing device 300 while rotating the photographing target 200, and to combine the 2-D images are combined with each other after one full rotation (360°) has been finished, so that the 3-D image is generated. To this end, the rotation unit 131 performs an operation of stopping the rotation thereof for a moment to photograph the photographing target 200 after rotation at a predetermine angle, and then rotating at a predetermined angle, repeatedly according to the number of photographing times.

Accordingly, the rotation control device 132 is configured to rotate the rotating unit 131 at a predetermined rotation angle one time according to information included in the control command when the control command is received from the external device, that is, the information on the rotation angle when the rotating unit 131 is driven one time. In addition, the rotation control device 132 controls the driving of the rotation unit 131 so that the rotation unit 131 is rotated one time after being in a standby state by preset standby time (which is time taken to photograph the photographing target 200, which is stopped, by the photographing device 300.

For example, when a second hand of a clock is rotated about a central axis, the second hand is rotated at a predetermined angle (6°) and in a standby state for predetermined time, thereby making one second. Through the above principle, according to the present invention, the rotation control device 132 sets a rotation angle that the rotation unit 131 is rotated when driven one time, and controls the driving of the rotation unit 131 so that the rotation unit 131 is in the standby state after being rotated at the set rotation angle, and rotated at the set rotation angle again after the photographing device 300 has photographed the photographing target 200 stopped after rotated.

In the case that a communication unit (for example, a transmission unit, such as WiFi or Bluetooth, for short range communication) allowing data transmission is installed in the photographing device 300, when receiving the control command from the external device, the rotation control device 132 controls the driving of the rotation unit 131 to rotate the rotation unit 131 at the set rotation angle one time, and then to rotate the rotation unit 131 one time immediately after receiving a signal, which notifies that the photographing target 200 has been photographed, from the communication unit of the photographing device 300 without the requirement for the standby state.

The rotation control device 132 controls the driving of the rotation unit 131 through various control schemes as described above, so that the functions according to the present invention can be effectively performed regardless of the type of the photographing device 300.

Various control commands may be received from the external device as long as the control commands include information allowing the extraction of the information on the rotation angle of the rotation unit 131 when the rotation unit 131 is driven one time. For example, the information may include information on the number of photographed images when the photographing target 200 is rotated one time (360 degree-rotation). If the number of the photographed images is 10, the rotation angle may be, for example, 36 degrees.

Meanwhile, the information allowing the extraction of the rotation angle as described above may include at least one of information (which may be identical to the information of the number of photographed images, but may include different data) on the number of photographing times of the photographing device 300 to photograph the photographing target 200 when the photographing target 200 is rotated one time, information (for example, information on a second-unit-based photographing interval) on time required for the photographing of the photographing device 300 to photograph the photographing target 200 when the photographing target 200 is rotated one time, and information on a rotation angle of the photographing target 200 when the photographing target 200 is photographed one time, that is, direct information on the rotation angle in one driving operation.

The information may be input through a portable terminal of a user and transmitted to the rotation control device 132.

As described above, the turn table 100 for photographing according to one embodiment of the present invention includes a simple device and a low-priced studio device, so that the user can generate the 3-D image for the photographing target 200, which is obtained through a professional device or a work in a professional studio, through a significantly simple configuration for the use of the 3-D image. Accordingly, users can use the 3-D image online and offline without the rental of the professional device and the professional studio, so that professional images can be used for the general purpose.

Figure 2:
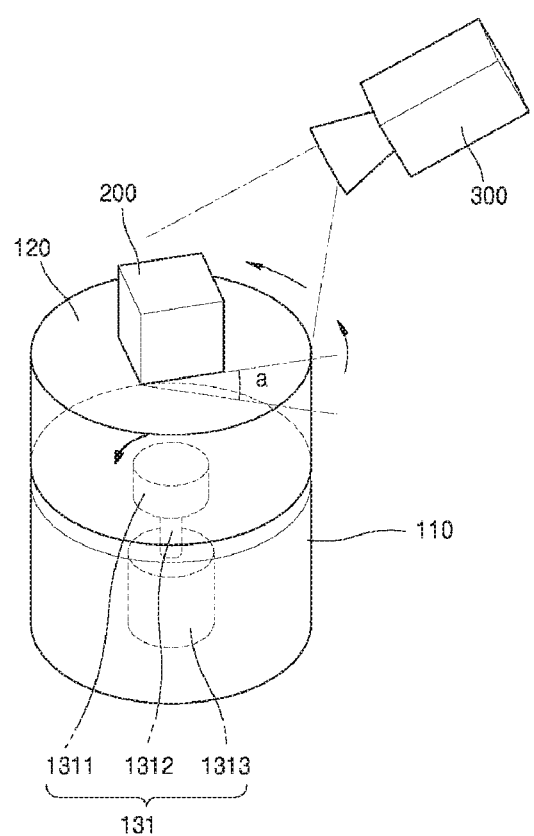
FIG. 2 is a view to explain the operation of the turn table for photographing according to one embodiment of the present invention.

FIG. 2 is a view to explain the operation of the turn table for photographing according to one embodiment of the present invention. In the following description, the same parts as those of details described with reference to FIG. 1 will be omitted in order to avoid redundancy.

Referring to FIG. 2, in the turn table for photographing, the photographing target 200 may be located in the upper body 120, and the upper body 120 is installed to be rotated relatively to the lower body 110 by the rotation unit 131. Accordingly, the photographing target 200 is rotated as the upper body 120 is rotated. During the rotation of the photographing target 200, the photographing device 300 photographs the photographing target 200.

For example, as described above, the rotation unit 131 includes the power transmission unit 1311 coupled to the body 120, the rotation shaft 1212 coupled to the power transmission unit 1311 to provide rotational force, and the motor 1313 to receive energy from a power source to generate the rotational force and to provide the rotational force to the rotation shaft 1212. In this case, the motor 1313 is driven to rotate the upper body 120 at a preset rotation angle a in one driving operation according to the control command as described above, and then the driving of the motor 1313 is stopped. Simultaneously, the rotation of the photographing target 200 is stopped. In this case, the photographing device 300 photographs the photographing target 200 to generate the 2-D image.

Figure 3:
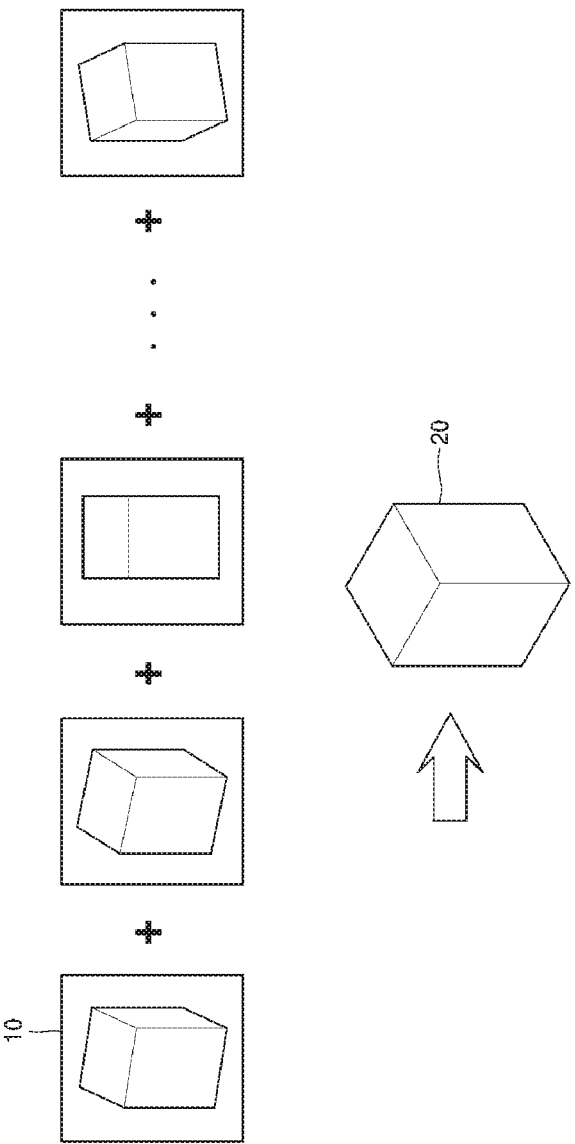
FIG. 3 is a view to explain a process of generating a 3-D image according to one embodiment of the present invention.

FIG. 3 is a view to explain a process of generating a 3-D image according to one embodiment of the present invention. In the following description, the same parts as those of details described with reference to FIGS. 1 and 2 will be omitted in order to avoid redundancy.

Referring to FIG. 3, when the photographing device photographs the photographing target as the photographing target 200 is rotated and stopped, a plurality of 2-D images 10 are generated by photographing the photographing target at mutually different angles as the photographing target is rotated as shown in FIG. 3.

An image generating device (not shown), which is included in the image photographing system using the turn table for the photographing according to one embodiment of the present invention, combines the 2-D images 10 of the photographing target 200, which are generated by photographing the photographing target 200 by the photographing device 300, with each other, thereby generating a 3-D image for the photographing target 200.

The image photographing system using the turn table for the photographing according to one embodiment of the present invention includes, in addition to the image generating device, the photographing device, which generates a 2-D image by photographing the photographing target 200 placed on the turn table for the photographing, and a photographing control module (not shown) which is connected with the rotation control device and the photographing device to make data communication to control the turn table to be rotated according to a control command and to control the photographing of the photographing device so that the photographing device photographs the photographing target rotated together with the rotation of the turn table for the photographing as described above.

Other than the photographing device, components of the image photographing system using the turn table for the photographing according to one embodiment of the present invention may be configured to have functions performed as an application installed in a portable terminal of the user is executed. In other words, the image generating device and the photographing control module may be components included in processors of the portable terminal. Meanwhile, a part of components in the photographing control module is installed in the turn table for the photographing as well as the portable terminal as described below.

Figure 4:
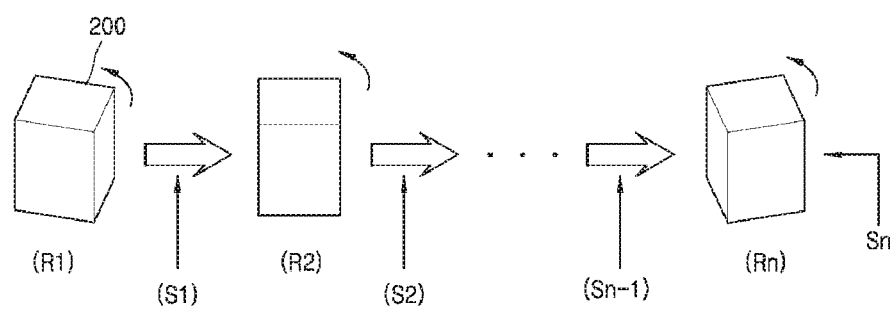
FIG. 4 is a view to explain a process of photographing a photographing target according to one embodiment of the present invention.

FIG. 4 is a view to explain a process of photographing a photographing target according to one embodiment of the present invention. In the following description, the same parts as those of details described with reference to FIGS. 1 to 3 will be omitted in order to avoid redundancy.

Referring to FIG. 4, the photographing target 200 is subject to one rotation R1 at a specific rotation angle and the rotation of the photographing target 200 is stopped as described above. As described above, the photographing control module controls the driving of the rotation unit so that the rotation unit in the turn table is driven one time to perform one rotation operation R1 at the rotation angle included in the control command as described above. Thereafter, when the rotation is stopped, that is, after the rotation unit has been driven one time, the photographing control module controls the photographing device 300 to perform a photographing operation S1 for the photographing target 200.

If the above driving is repeated by R1 to Rn and S1 to Sn as shown in FIG. 4, the photographing device 300 generates mutually different 2-D images resulting from the rotation of the photographing target 200 until the photographing target 200 is fully rotated one time. When the 2-D images are combined with each other as described with reference to FIG. 3, the 3-D image for the photographing target 200 is generated. In other words, a camera, which can receive the control command through a short range communication unit, and the turn table for the photographing according to one embodiment of the present invention are provided without the utilization of a high-priced 3-D photographing device, thereby easily generating the 3-D image of an article for the use thereof.

Figure 5:
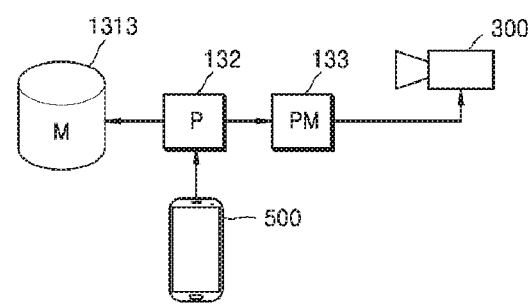
FIG. 5 is a view showing an example of the detailed structure of a photographing control module according to one embodiment of the present invention.

FIG. 5 is a view showing an example of the detailed structure of a photographing control module according to one embodiment of the present invention.

As described above, although the photographing control module is installed in the portable terminal 500, a part of the photographing control module may be installed in the turn table for photographing.

In detail, referring to FIG. 5, the photographing control module includes a first control module (not shown, provided in the portable terminal 500), which is installed in a portable terminal 500 to transmit the control command to the rotation control device 132 of the turn table when receiving the control command input into an input unit of the portable terminal 500 of a user and to drive the motor 1313, and a second control module 133 which is installed in the turn table to be connected with the rotation control device 132, and has a short range wireless communication function to transmit a photographing control signal included in the control command from the rotation control device 132 to the photographing device 300 so that the photographing device 300 photographs the photographing target 200 according to the photographing control signal.

According to the present invention, a short range communication scheme to transmit or receive the control command and the photographing control single may include various schemes including Bluetooth, WiFi, and Zigbee as long as data corresponding to the control command and the photographing control signal can be transmitted and received within a short range distance.

The portable terminal 500, the turn table for the photographing, and the photographing device 300 may be connected with each other through the short range wireless communication scheme. In this case, since a short range wireless communication unit of the photographing device 300 may be limited, the second control module 133 of the photographing control module, which transmits the photographing control signal to allow the photographing device 300 to start photographing, is separately provided so that data can be easily transmitted and received between the turn table and the photographing device 300 which can be located at a shorter distance. In addition to the component of FIG. 5, the photographing control module is installed as one component in the portable terminal 500, so that the control command and the photographing control signal may be transmitted to the rotation control device 132 and the photographing device 300 through the communication unit of the portable terminal 500. In addition, the photographing control module may include various components to perform the function of the present invention.

The first control module transmits a control command, which allows the rotation unit of the turn table to rotate one time at a rotation angle according to information on the rotation angle applied when the rotation unit is driven one time as described above, to the rotation control device 132 and transmits a control command, which allows the rotation unit to rotate one time, to the rotation control device 132 if receiving a signal to notify that the photographing target 200 has been photographed from a communication unit in the case that the communication unit is installed in the photographing device 300 as described with reference to FIG. 1. In the case that the communication unit is not installed in the photographing device 300, the first control module transmits a control command, which maintains the standby state for preset standby time and repeats rotation until one full rotation (360 degree-rotation), to the rotation control device 132.

The second control module 133 transmits a photographing control signal to the photographing device 300, in which the photographing control signal is a signal to control photographing timing of the photographing device 300 so that the photographing device 300 photographs the photographing target 200 after the rotation unit has been driven one time to be rotated at the preset rotation angle by the first control module.

In detail, the second control module 133 transmits the photographing control signal to the photographing device 300 without the consideration of standby time if the communication unit is installed in the photographing device 300 when the photographing control signal is transmitted. Alternatively, if the communication unit is not installed in the photographing device 300, the second control module 133 transmits a signal to control the photographing timing so that the photographing device 300 photographs the photographing target 200 for preset standby time.

According to another embodiment of the present invention, the photographing device 300 may be a camera installed in the portable terminal 500. In this case, the second control module 133 may be included in the first control module.

Figure 6:
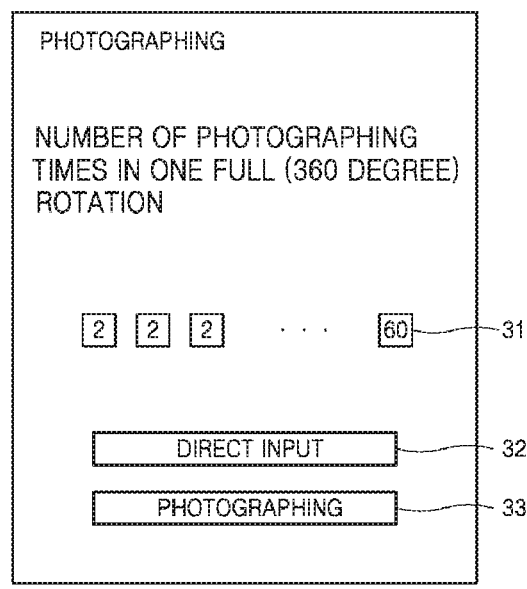
FIGS. 6 and 7 are views showing examples of screen images output to a portable terminal of a user according to one embodiment of the present invention.
Figure 7:
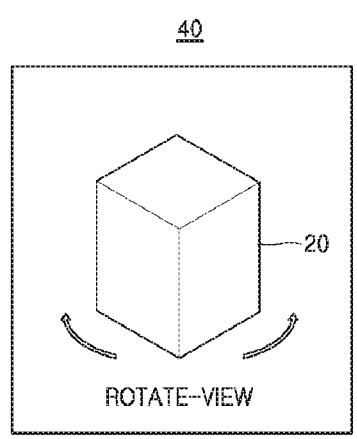

FIGS. 6 and 7 are views showing examples of screen images output to a portable terminal of a user according to one embodiment of the present invention. In the following description, the same parts as those of details described with reference to FIGS. 1 to 5 will be omitted in order to avoid redundancy.

As shown in FIGS. 6 and 7, the portable terminal according to the present invention refers to a component to execute an application allowing an input for the control command, and allowing the recognition of the 2-D image generated from the photographing device 300 and the 3-D image generated from the image generating device. In addition, the portable terminal according to the present invention may include a component to transmit the control command and the photographing control signal as described above in addition to the function of the component.

Referring to a control command input screen image 30 of FIG. 6, a user may input information on the control command, from which the rotation angle in one full rotation (360 degree-rotation) may be extracted, through the control command input screen image 30. FIG. 6 shows a menu enabling a user to select the number of photographing times 31, a personal input menu enabling the user to personally input the number of photographing times, and a photographing menu 33 to start the photographing.

Meanwhile, as described with reference to FIG. 1, a menu is formed for the input by a user by including at least one of information on the number of photographed images when the photographing target is rotated one time, information on the number of times that the photographing device photographs the photographing target when the photographing target is rotated one time, information on photographing time of the photographing device to photograph the photographing target when the photographing target is rotated one time, and information on a rotation angle of the photographing target when the photographing target is photographed one time, in a control command in the form similar to that of the interface shown in FIG. 6. Accordingly, the user can control the photographing operation through various input schemes.

Meanwhile, referring to FIG. 7 showing an image recognition screen image 40, a user may recognize a 3-D image 20, which is generated from the image generating device, through a rotate view function. In this case, the 3-D image 20 is generated by performing a function described with reference to FIG. 3, in detail, generated by combining the 2-D images, which are generated by performing the function, with each other.

All functions of the turn table for photographing and the image photographing system using the same according to the embodiment of the present invention described above and advertisement interface functions output corresponding to the functions may be performed by an application (which may include program included in a platform or an operating system basically installed in the user terminal) basically installed in a user terminal, and may be performed by an application (that is, program) personally installed in the user terminal by a user through an application provider server such as an application store server, or an application or service related web server. In this regard, all functions of the turn table for photographing and the image photographing system using the same according to the embodiment of the present invention described above and advertisement interface functions output corresponding to the functions may be realized through an application (that is program) basically installed in the user terminal or personally installed in the user terminal by the user and may be recorded in a computer-readable recording medium of the user terminal.

The program is recorded in the computer-readable recording medium and executed by a computer to perform the above-described functions.

As described above, in order to perform all functions of the turn table for photographing and the image photographing system using the same according to the embodiment of the present invention described above and advertisement interface functions output corresponding to the functions, the above-described program may include codes coded in computer languages such as C, C++, JAVA, and Assembly.

The codes may include function codes related to functions defining the above-described functions, and procedure-related control codes required to perform the above-described functions along a predetermined procedure by a computer processor.

In addition, the codes may further include memory-reference-related codes to represent the location (address) of an internal memory or an external memory where additional information or media required to perform the above functions by a computer processor are referred to.

In addition, when the computer processor needs to make communication with another remote computer or server in order to perform the above-described functions, the codes may further include communication-related-codes to represent a remote computer or server making communication with the computer processor through a communication module (for example, wired and/or wireless communication module) of a computer, a communication scheme between the computer processor and the remote computer or server, and the type of information or media to be transmitted/received in communication.

Further, functional programs, relevant codes, and relevant code segments to realize the present invention may be easily reasoned or changed, in consideration with a computer system environment to read the recoding medium and to execute the program, by programmers in the art to which the present invention pertains The computer-readable recording medium to record the program therein may include, for example, a ROM, RAM, CD-ROM, magnetic tape, floppy-disc, or optical media storage device.

In addition, the record media readable by the processor are distributed into computer systems connected to each other over a network to store and execute codes readable by the processor through a distribution scheme. In this case, at least one of a plurality of distributed computers may perform a part of the above functions and transmit the result to at least one of other distributed computers. The computer, which has received the result, may perform a part of the above functions, and transmit the result to other distributed computers.

A computer-readable recording medium to record an application, which is program to perform all functions of the turn table for photographing and the image photographing system using the same according to the embodiment of the present invention described above and advertisement interface functions output corresponding to the functions may be a storage medium (for example, hard-disc) included in an application provider server, such as an application store server, or an application or corresponding service-related-web server, or the application provider server.

A computer, which can read a recording medium to record an application, which is program to perform all functions of the turn table for photographing and the image photographing system using the same according to the embodiment of the present invention described above and advertisement interface functions output corresponding to the functions, may include not only a typical personal computer (PC), such as a typical desk-top computer, or lap-top computer, but also a smart phone, a tablet PC, a personal digital assistant (PDA), and a mobile terminal of a mobile communication terminal. In addition, the computer must be interpreted as all devices which are capable of computing.

When the computer, which can read the recording medium to record an application, which is program to perform all functions of the turn table for photographing and the image photographing system using the same according to the embodiment of the present invention described above and advertisement interface functions output corresponding to the functions, is the smart phone, the tablet PC, the personal digital assistant (PDA), and the mobile terminal of a mobile communication terminal, the application may be downloaded from the application provider server to the typical PC and installed in the mobile terminal through synchronization program.

As described above, although the above description has been made in that all components according to the embodiment of the present invention are integrated into one or operated in the integrated structure, the present invention is not limited to the embodiment. In other words, at least one of the components may be selectively combined and operated within the scope of the present invention. Further, although the all components can be individually realized in independent hardware, a part or all of the components may be selectively combined and realized through computer program having a program module to perform a partial function or all functions combined in one hardware or a plurality of hardwares. Codes and code segments constituting the computer program can be easily reasoned by those skilled in the art which the present invention pertains. The computer program may be stored in computer readable media, read, and executed by the computer, so that the embodiment of the present invention can be realized. The storage media for the computer program may include magnetic media and optical recording media.

In addition, the terms "include", "comprises", or "has" refers to that a corresponding component does not exclude other components, but may further include other components if there is not a specific opposite description. All terms including technical or scientific terms are interpreted as having commonly-understood meanings by those skilled in the art unless defined otherwise. Commonly-used terms, such as terms defined in a dictionary, should be interpreted as having meanings matched with contextual meanings of the art to which the present invention pertains, and not ideally or excessively formally interpreted unless defined clearly in the specification.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A photographing turn table, which is installed in one area of a studio device which allows image-photographing for a photographing target located in the one area, wherein the studio device comprises a background with an inner wall the photographing turn table comprising:
   a lower body fixedly located at the one area, wherein the lower body has a cylindrical shape and a curved outer surface;
   a light emitting unit having a curved shape and installed along a part of the curved outer surface of the lower body, wherein the light emitting unit faces away from the photographing target and the curved outer surface and toward the inner wall of the background, and wherein the photographing target is disposed between a photographing device and the background;
   an upper body coupled to a top surface of the lower body rotatable relative to the lower body; and
   a rotation module which includes a rotation unit to rotate the upper body relatively to the lower body, and a rotation control device including a communication function to receive a control command from an external device and to control driving of the rotation unit according to the control command.

2. The photographing turn table of claim 1, further comprising a light emission control device which is connected with the light emitting unit to control at least one of a light quantity, a color temperature, and a light irradiation area of the light emitting unit according to a control command for the at least one of the light quantity, the color temperature, and the light irradiation area of the light emitting unit, which is transmitted from an external device.

3. The photographing turn table of claim 1, wherein the upper body is configured in a cylindrical shape, and the upper and lower bodies have equal diameters.

4. The photographing turn table of claim 1, wherein the rotation control device controls the driving of the rotation unit to rotate the rotating unit at a rotation angle one time according to information included in the control command when the control command is received from the external device, the information including information on the rotation angle applied when the rotating unit is driven one time, and then to rotate the rotation unit one time after being in a standby state for preset standby time.

5. The photographing turn table of claim 1, wherein the rotation control device controls the driving of the rotation unit to rotate the rotating unit at a rotation angle one time according to information included in the control command when the control command is received from the external device, the information including information on the rotation angle applied when the rotating unit is driven one time, and then to rotate the rotation unit one time when receiving a signal, which notifies that the photographing target is photographed, from a communication unit of the photographing device, which photographs the photographing target.

6. The photographing turn table of claim 1, wherein the control command includes at least one of information on the number of photographed images when the photographing target is rotated one time, information on a number of times that the photographing device photographs the photographing target when the photographing target is rotated one time, information on photographing time of the photographing device to photograph the photographing target when the photographing target is rotated one time, and information on a rotation angle of the photographing target when the photographing target is photographed one time.

7. An image photographing system for photographing an image using the photographing turn table according to claim 1, the image photographing system comprising:
   a photographing device to photograph a photographing target placed on the photographing turn table;
   a photographing control module connected with the photographing device and the rotation control device of the photographing turn table to transmit/receive data and to control the photographing device to photograph the photographing target rotated together with rotation of the photographing turn table according to the control command; and
   an image generating device which combines two dimensional photographed images of the photographing target, which is photographed by the photographing device, with each other to generate a three dimensional photographed image of the photographing target.

8. The image photographing system of claim 7, wherein the photographing control module controls the driving of the rotation unit of the photographing turn table to rotate the rotation unit at a rotation angle included in the control command when the rotation unit is driven one time, and controls the photographing device to photograph the photographing target after the rotation unit is driven one time.

9. The image photographing system of claim 7, wherein the photographing control module includes:
   a first control module installed in a portable terminal to transmit a control command to the rotation control device of the photographing turn table when receiving the control command input into an input unit of the portable terminal of a user; and
   a second control module which is installed in the photographing turn table to be connected with the rotation control device, and has a short range wireless communication function to transmit a photographing control signal to the photographing device using the short range wireless communication function when receiving the photographing control signal included in the control command from the rotation control device, such that the photographing device photographs the photographing target according to the photographing control signal.

10. The image photographing system of claim 9, wherein the first control module transmits a control command, which allows the rotation unit of the photographing turn table to be driven one time at a rotation angle according to information on the rotation angle applied when the rotation unit is driven one time, to the rotation control device, and transmits a control command, which allows the rotation unit to rotate one time, to the rotation control device when receiving a signal to notify that the photographing target is photographed from a communication unit in the photographing device.

11. The image photographing system of claim 9, wherein the first control module transmits a control command, which allows the rotation unit of the photographing turn table to rotate one time at a rotation angle according to information on the rotation angle applied when the rotation unit is driven one time, to the rotation control device, and transmits a control command, which allows the rotation unit to be maintained in a standby state for preset standby time and to be driven one time, to the rotation control device.

12. The image photographing system of claim 11, wherein the second control module transmits a photographing control signal, which allows the photographing device to photograph the photographing target, to the photographing device while the rotation unit is driven one time by the first control module and maintained in the standby state for the present standby time.

13. The image photographing system of claim 7, further comprising a portable terminal to execute an application allowing an input for the control command and allowing recognition of the two dimensional photographed image generated from the photographing device and the three dimensional photographed image generated from the image generating device.

14. The image photographing system of claim 13, wherein the portable terminal inputs at least one of information on a number of photographed images when the photographing target is rotated one time, information on a number of times that the photographing device photographs the photographing target when the photographing target is rotated one time, information on photographing time of the photographing device to photograph the photographing target when the photographing target is rotated one time, and information on a rotation angle of the photographing target when the photographing target is photographed one time, in the control command through the input into the application.

* * * * *